United States Patent
Sakaguchi

(10) Patent No.: US 10,344,635 B2
(45) Date of Patent: Jul. 9, 2019

(54) HYDRAULIC PRESSURE CONTROL VALVE AND INTERNAL-COMBUSTION ENGINE VALVE TIMING CONTROL APPARATUS

(71) Applicant: HITACHI AUTOMOTIVE SYSTEMS, LTD., Hitachinaka-shi, Ibaraki (JP)

(72) Inventor: Shoki Sakaguchi, Yokohama (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/735,294

(22) PCT Filed: May 13, 2016

(86) PCT No.: PCT/JP2016/064267
§ 371 (c)(1),
(2) Date: Dec. 11, 2017

(87) PCT Pub. No.: WO2016/199541
PCT Pub. Date: Dec. 15, 2016

(65) Prior Publication Data
US 2018/0171835 A1    Jun. 21, 2018

(30) Foreign Application Priority Data

Jun. 12, 2015 (JP) .................. 2015-118920

(51) Int. Cl.
*F01L 1/34* (2006.01)
*F01L 1/356* (2006.01)
(Continued)

(52) U.S. Cl.
CPC ............. *F01L 1/356* (2013.01); *F01L 1/3442* (2013.01); *F01L 1/34413* (2013.01);
(Continued)

(58) Field of Classification Search
CPC ..... F01L 1/356; F01L 1/3442; F01L 1/34413; F01L 2001/3444; F01L 2001/3443;
(Continued)

(56) References Cited

U.S. PATENT DOCUMENTS

| 6,382,148 B1 * | 5/2002 | Maeyama ................. F01L 1/34 123/90.15 |
| 2010/0243085 A1 * | 9/2010 | Van Weelden ...... F15B 13/0402 137/544 |
| 2013/0048112 A1 | 2/2013 | Nemoto et al. |

FOREIGN PATENT DOCUMENTS

| JP | 2006-022816 A | 1/2006 |
| JP | 2013-050166 A | 3/2013 |
| JP | 2014-025518 A | 2/2014 |

\* cited by examiner

*Primary Examiner* — Zelalem Eshete
(74) *Attorney, Agent, or Firm* — Foley & Lardner LLP

(57) ABSTRACT

Provided is a hydraulic pressure control valve capable of exhibiting a filter detent function without degrading the assemblability of filters to a valve body.

A hydraulic pressure control valve according to the present invention includes a valve body having a plurality of opening portions formed in a cylindrical peripheral wall, annular grooves, and a restraining portion provided in each of the annular grooves, a spool valve, and filters wound to cover the opening portions, respectively, and each having a mesh portion for filtering hydraulic fluid and a mask portion covering the restraining portion.

13 Claims, 19 Drawing Sheets

(51) Int. Cl.
  *F16K 51/00* (2006.01)
  *F01L 1/344* (2006.01)
  *F15B 13/04* (2006.01)
  *F15B 21/041* (2019.01)
  *F16K 31/06* (2006.01)
  *F16K 31/10* (2006.01)
  *F16K 27/04* (2006.01)

(52) U.S. Cl.
  CPC ........ *F15B 13/0402* (2013.01); *F15B 21/041* (2013.01); *F16K 27/041* (2013.01); *F16K 31/0613* (2013.01); *F16K 31/10* (2013.01); *F16K 51/00* (2013.01); *F01L 2001/3443* (2013.01); *F01L 2001/3444* (2013.01); *F01L 2103/01* (2013.01); *F01L 2250/02* (2013.01)

(58) Field of Classification Search
  CPC ... F01L 2103/01; F01L 2250/02; F16K 51/00; F16K 31/0613; F16K 31/10; F16K 27/041; F15B 21/041; F15B 13/0402
  See application file for complete search history.

(a)

(b)

(a)

(b)

(a)

(b) A-A sectional view (c) B-B sectional view

HYDRAULIC PRESSURE CONTROL VALVE AND INTERNAL-COMBUSTION ENGINE VALVE TIMING CONTROL APPARATUS

TECHNICAL FIELD

The present invention relates to a hydraulic pressure control valve switching between flow paths by movement of a spool.

BACKGROUND ART

As a hydraulic pressure control valve, a technique described in Patent Literature 1 is conventionally known. The patent literature discloses a hydraulic pressure control valve having a valve body, a spool valve, and filters. The valve body is in the shape of a substantially cylinder and has in an outer peripheral surface thereof opening portions through which hydraulic fluid flows. There are provided a plurality of opening portions spaced from each other at predetermined intervals in the axial direction of the valve body. The valve body has a plurality of circumferentially continuous annular grooves on the outer peripheral surface at axially spaced positions at which the opening portions are formed, respectively. The spool valve is movably provided in the valve body to switch between opening and closing of each opening portion. The filters are individually fitted to cover the opening portions circumferentially of the annular grooves, thereby filtering hydraulic fluid flowing into the opening portions. Further, when the axial direction is assumed to be the widthwise direction, each filter has a capturing portion formed with a relatively wide width. The capturing portion covers the associated opening portion to capture contamination or other foreign matter which may be contained in the hydraulic fluid. Each filter further has connecting portions formed at respective positions circumferentially opposing each other across the capturing portion. The connecting portions are narrower in width than the capturing portion. The connecting portions are welded together at respective end portions which are in surface contact with each other in the radial direction, thereby forming a ring-shaped filter.

CITATION LIST

Patent Literature

PTL 1: Japanese Patent Application Laid-Open Publication No. 2013-50166

SUMMARY OF INVENTION

Technical Problem

With the technique described in PTL 1, however, each filter has a relatively wide capturing portion and relatively narrow connecting portions provided in the circumferential direction thereof to impart to the filter a detent function to prevent the filter from moving circumferentially relative to the valve body. Therefore, high positioning accuracy is required to assemble the filter to the valve body, which degrades the assemblability.

The present invention has been made in view of the above-described problem, and an object of the present invention is to provide a hydraulic pressure control valve capable of exhibiting a filter detent function without degrading the assemblability of filters to a valve body.

Solution to Problem

A hydraulic pressure control valve according to one embodiment of the present invention comprises the following elements: a valve body including a plurality of opening portions formed in a cylindrical peripheral wall, annular grooves, and a restraining portion provided in each of the annular grooves; a spool valve; and filters wound to cover the opening portions, respectively, and each including a mesh portion for filtering hydraulic fluid and a mask portion covering the restraining portion.

Accordingly, with the hydraulic pressure control valve according to one embodiment of the present invention, when the filters are to be wound in the annular grooves, respectively, each filter can be assembled simply by aligning the restraining portion and the mask portion with each other. Therefore, the hydraulic pressure control valve can exhibit an axial positioning function and detent function for the filters without degrading the assemblability of the filters.

DESCRIPTION OF EMBODIMENTS

First Embodiment

Figure 1:
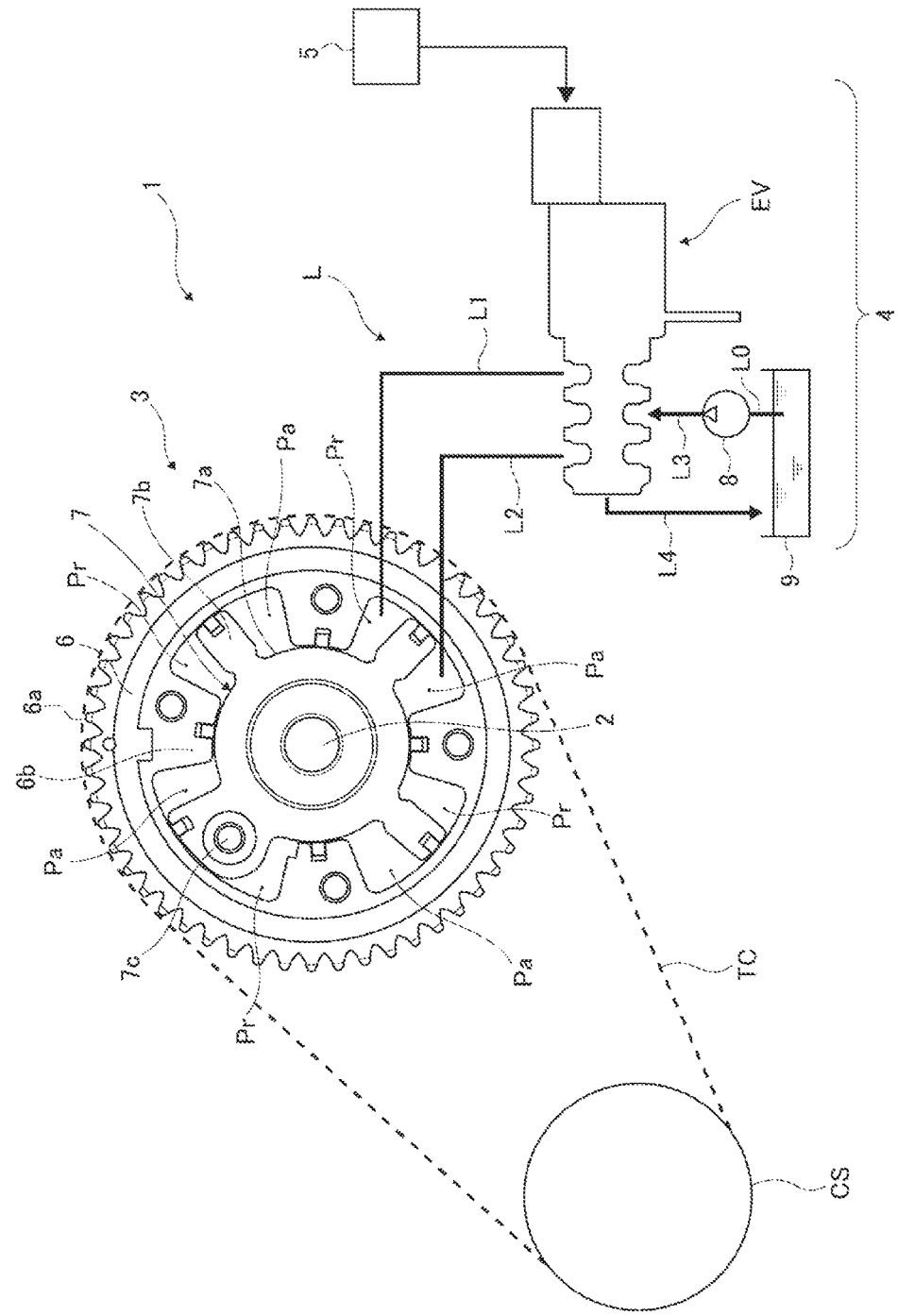
FIG. 1 is a schematic view of an internal-combustion engine valve timing control apparatus according to a first embodiment.

FIG. 1 is a schematic view showing an internal-combustion engine valve timing control apparatus according to a first embodiment. The valve timing control apparatus has a timing sprocket 6a rotationally driven through a timing chain TC from a crankshaft CS of an engine, a cam shaft 2 provided rotatably relative to the timing sprocket 6a, a phase change mechanism 3 interposed between the cam shaft 2 and the timing sprocket 6a to change relative phase between the timing sprocket 6a and the cam shaft 2 by hydraulic pressure, a hydraulic pressure supply-discharge device 4 supplying and discharging hydraulic fluid to and from the phase change mechanism 3, and an electronic control unit 5 controlling the operation of the hydraulic pressure supply-discharge device 4.

The phase change mechanism 3 has a cylindrical housing 6 integrally provided with the timing sprocket 6a at the inner peripheral side of the latter, and a vane rotor 7 secured to one end portion of the cam shaft 2 from the axial direction and rotatably accommodated in the housing 6. The housing 6 has four shoes 6b projecting from the inner periphery of the housing 6 to slidingly contact the outer peripheral surface of an annular proximal portion 7a of the vane rotor 7. The vane rotor 7 has four vanes 7b projecting from the outer periphery thereof to correspond to the shoes 6b, respectively. The vanes 7b each divide an area surrounded by a pair of mutually adjacent shoes 6b and the annular proximal portion 7a into a retard chamber Pr and an advance chamber Pa. The hydraulic pressure supply-discharge device 4 selectively supplies and discharges hydraulic fluid into and from the retard chamber Pr and the advance chamber Pa to change the relative phase of the cam shaft 2 with respect to the timing sprocket 6a. It should be noted that one of the vanes 7b is provided with a lock mechanism 7c restraining free rotation of the vane rotor 7 at the most retarded position to stabilize the operation of the phase change mechanism 3 at the time of engine starting and idling, etc.

The hydraulic pressure supply-discharge device 4 has a pump 8 as a hydraulic pressure supply source delivering hydraulic fluid, which has been stored in an oil pan 9. The hydraulic pressure supply-discharge device 4 further has an electromagnetic valve EV as a hydraulic pressure control valve for flow path switching that supplies hydraulic fluid delivered by the pump 8 into either the retard chamber Pr or the advance chamber Pa and leads out hydraulic fluid from the other chamber Pr or Pa back into the oil pan 9 according to a control signal from the electronic control unit 5. Further, the hydraulic pressure supply-discharge device 4 has an oil passage L providing communication between the electromagnetic valve EV or the oil pan 9 and the retard chamber Pr or the advance chamber Pa.

The oil passage L has a retard passage L1, an advance passage L2, a suction passage L0, an inlet passage L3, and a drain passage L4. The retard passage L1 communicates between a retard port 113a (described later) of the electromagnetic valve EV and the retard chamber Pr of the phase change mechanism 3 to supply and discharge hydraulic fluid into and from the retard chamber Pr. The advance passage L2 communicates between an advance port 111a (described later) of the electromagnetic valve EV and the advance chamber Pa of the phase change mechanism 3 to supply and discharge hydraulic fluid into and from the advance chamber Pa. The suction passage L0 communicates between the oil pan 9 and a suction opening of the pump 8. The inlet passage L3 communicates between a discharge opening of the pump 8 and an inlet port 112a (described later) of the electromagnetic valve EV to lead hydraulic fluid delivered by the pump 8 toward the phase change mechanism 3. The drain passage L4 communicates between discharge ports 11b and 11c (described later) of the electromagnetic valve EV, on the one hand, and the oil pan 9, on the other, to return hydraulic fluid discharged from the discharge ports 11b and 11c to the oil pan 9. The electromagnetic valve EV selectively switches between the retard passage L1 and the advance passage L2 and between the inlet passage L3 and the drain passage L4.

Figure 2:
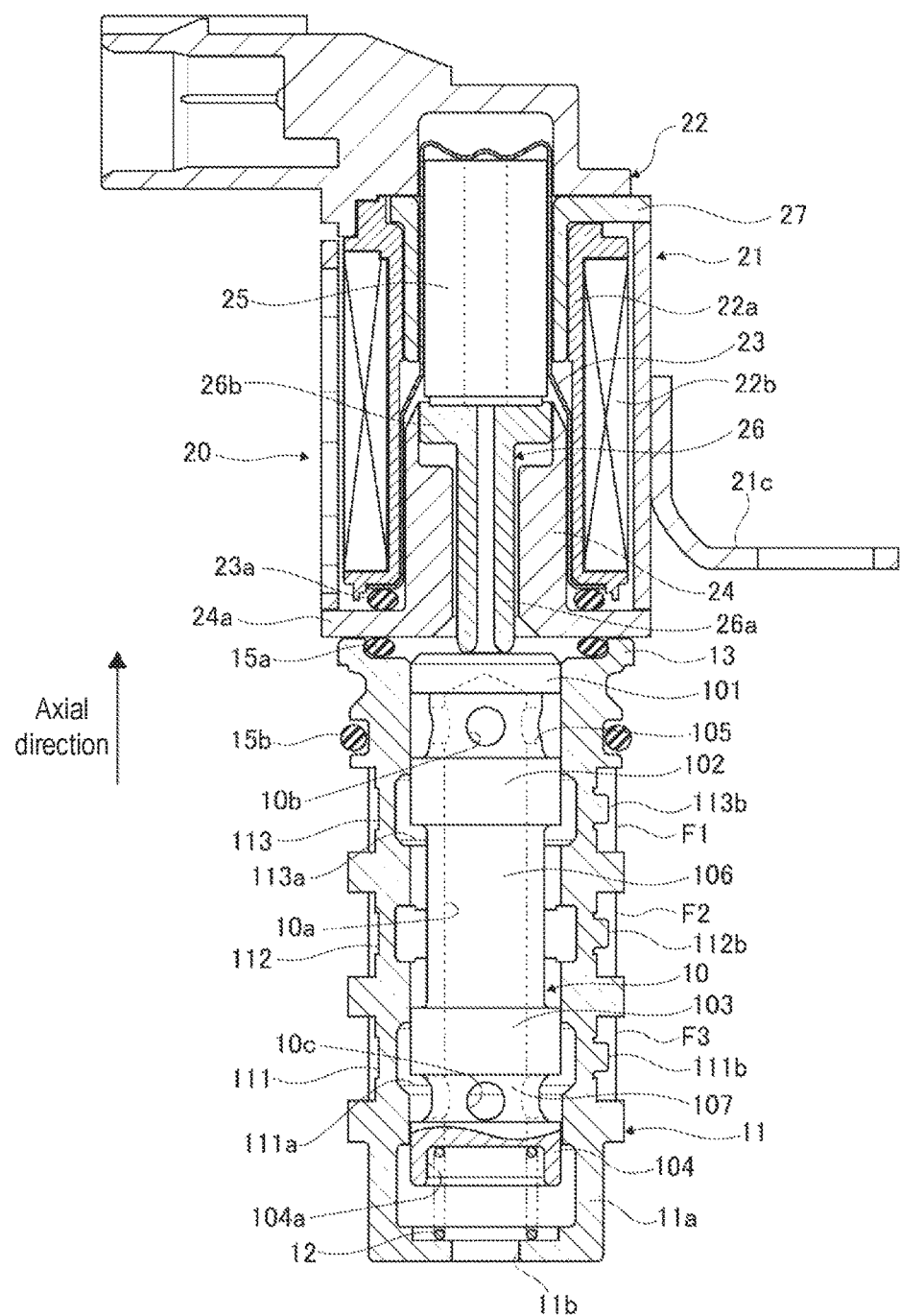
FIG. 2 is a sectional view showing the configuration of an electromagnetic valve in the first embodiment.
Figure 3:
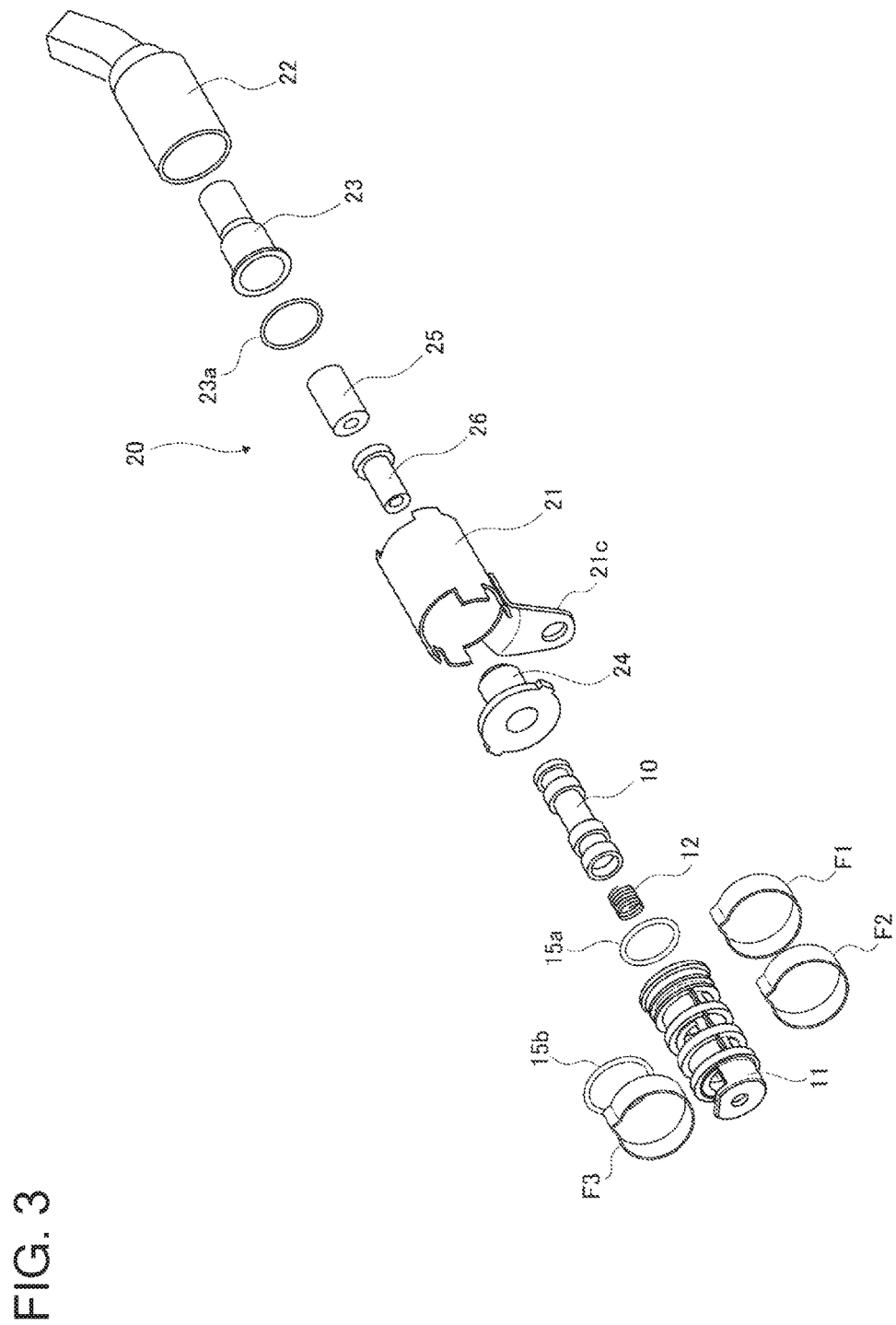
FIG. 3 is an exploded perspective view of the electromagnetic valve in the first embodiment.
Figure 4:
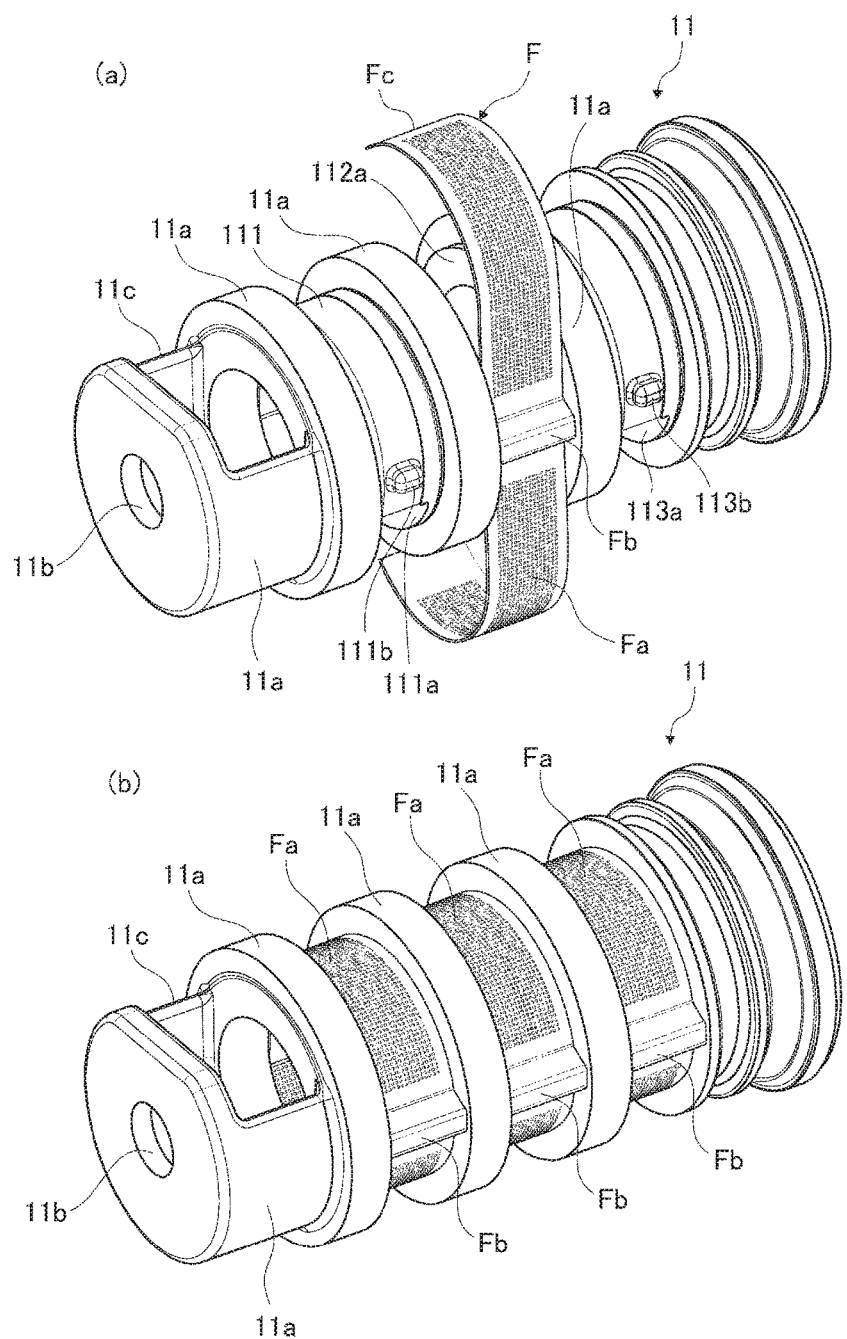
FIG. 4 is a perspective view of a valve body in the first embodiment.

FIG. 2 is a sectional view showing the configuration of the electromagnetic valve in the first embodiment. FIG. 3 is an exploded perspective view of the electromagnetic valve in the first embodiment. FIG. 4 is a perspective view of the valve body in the first embodiment. The electromagnetic valve EV shown in FIG. 2 is in a non-energized state. In this state, a spool valve 10 (described later) is located at an upper end position in FIG. 2. FIG. 4(a) shows a state where a filter has been placed over a restraining portion of one annular groove, and FIG. 4(b) shows a state where filters have been assembled into all annular grooves, respectively. The electromagnetic valve EV is what is called a sliding spool type four-port proportional electromagnetic switching valve. The electromagnetic valve EV has a valve body 11, a spool valve 10 axially movably accommodated in the valve body 11, and a coil spring 12 axially urging the spool valve 10.

As shown in FIG. 4, the valve body 11 has a cylindrical peripheral wall 11a, a plurality of ports as opening portions which allow hydraulic fluid to flow therethrough in the radial direction of the peripheral wall 11a, and a discharge port 11b axially extending through the valve body 11. The ports include a retard port 113a opening into the retard passage L1, an inlet port 112a (see FIG. 4) opening into the inlet passage L3, an advance port 111a opening into the advance passage L2, and discharge ports 11b and 11c opening into the drain passage L4. The valve body 11 has annular grooves 113, 112 and 111 on the outer periphery thereof at axially spaced positions at which the ports are formed, respectively. The annular grooves 113, 112 and 111 (these annular grooves will occasionally be collectively referred to as "the annular groove b0") are formed with restraining portions 113b, 112b and 111b (these restraining portions will occasionally be collectively referred to as "the restraining portion b1") to prevent rotation of filters F1, F2 and F3 (described later). Each restraining portion b1 is formed in a non-opening region of the annular groove b0, i.e. an annular groove bottom portion as a closed region, except where the associated port is formed (see FIG. 6).

The spool valve 10 is a hollow member having an oil passage 10a in the axial center thereof. The spool valve 10 has a first land portion 101, a second land portion 102, a third land portion 103, a fourth land portion 104, a first stem 105 connecting the first and second land portions 101 and 102, a second stem 106 connecting the second and third land portions 102 and 103, and a third stem 107 connecting the third and fourth land portions 103 and 104. The first stem 105 and the third stem 107 have a first through-hole 10b and a second through-hole 10c, respectively, extending therethrough to open into the oil passage 10a. The fourth land portion 104 has a retainer 104a formed at the axially lower end thereof to retain one end of the coil spring 12. Discharge and supply of hydraulic fluid are switched from one to the other on the basis of the communicating relationship between the ports and spaces lying between the above-described land portions.

The electromagnetic valve EV has an electromagnetic solenoid 20 at a position opposite to the coil spring 12 of the spool valve 10. The electromagnetic solenoid 20 is capable of pressing the spool valve 10 by electromagnetic force against the urging force of the coil spring 12. The electromagnetic solenoid 20 has a first fixed core 24 axially movably retaining a rod 26 at the inner periphery thereof. The rod 26 has a rod portion 26a which is a substantially cylindrical rod-shaped portion, and a flange portion 26b abutting against one end surface of an armature 25 activated under the action of electromagnetic force. The armature 25 is movably accommodated and retained at the inner periphery of a retaining cylindrical member 23. The electromagnetic solenoid 20 further has a second fixed core 27 provided at a position opposite to the first fixed core 24 such that the second fixed core 27 accommodates the armature 25 at the inner periphery side thereof. The first fixed core 24 and the second fixed core 27 are secured to the axially opposite ends, respectively, of a yoke 21, and thus the relative positions of the two fixed cores are determined.

The electromagnetic valve EV has a coil unit 22 around the two fixed cores. The coil unit 22 comprises a bobbin 22a and a coil 22b wound around the outer periphery of the bobbin 22a. The coil unit 22 is accommodated at the inner periphery side of the yoke 21, which is formed in a substantially cylindrical shape from a magnetic material. The upper end opening of the yoke 21 is closed by the electromagnetic solenoid 20, and the lower end opening of the yoke 21 is closed by a lower end flange portion 24a of the first fixed core 24. A first seal member 23a is clamped between the upper surface of the lower end flange portion 24a and the lower end of the retaining cylindrical member 23 to prevent leakage of hydraulic fluid from the inside of the retaining cylindrical member 23.

The valve body 11 is secured to the lower side of the lower end flange portion 24a. Between the lower surface of the lower end flange portion 24a and the valve body 11 is clamped a second seal member 15a to prevent leakage of hydraulic fluid from the inside of the valve body 11. In addition, a third seal member 15b is provided around the outer periphery of the valve body 11 to prevent leakage of hydraulic fluid from between the valve body 11 and a mounting hole of an engine block or the like formed with hydraulic fluid passages, etc., to the outside of the engine block.

When a control current is output from the electronic control unit 5, a magnetic path is formed through the yoke 21, the first fixed core 24, and the second fixed core 27, which are disposed around the coil unit 22. The armature 25 moves downward in FIG. 2 according to the magnetic force of the magnetic path. The movement of the armature 25 causes the rod 26 to press the spool valve 10 downward in FIG. 2, thereby controlling the axial position of the spool valve 10.

Figure 5:
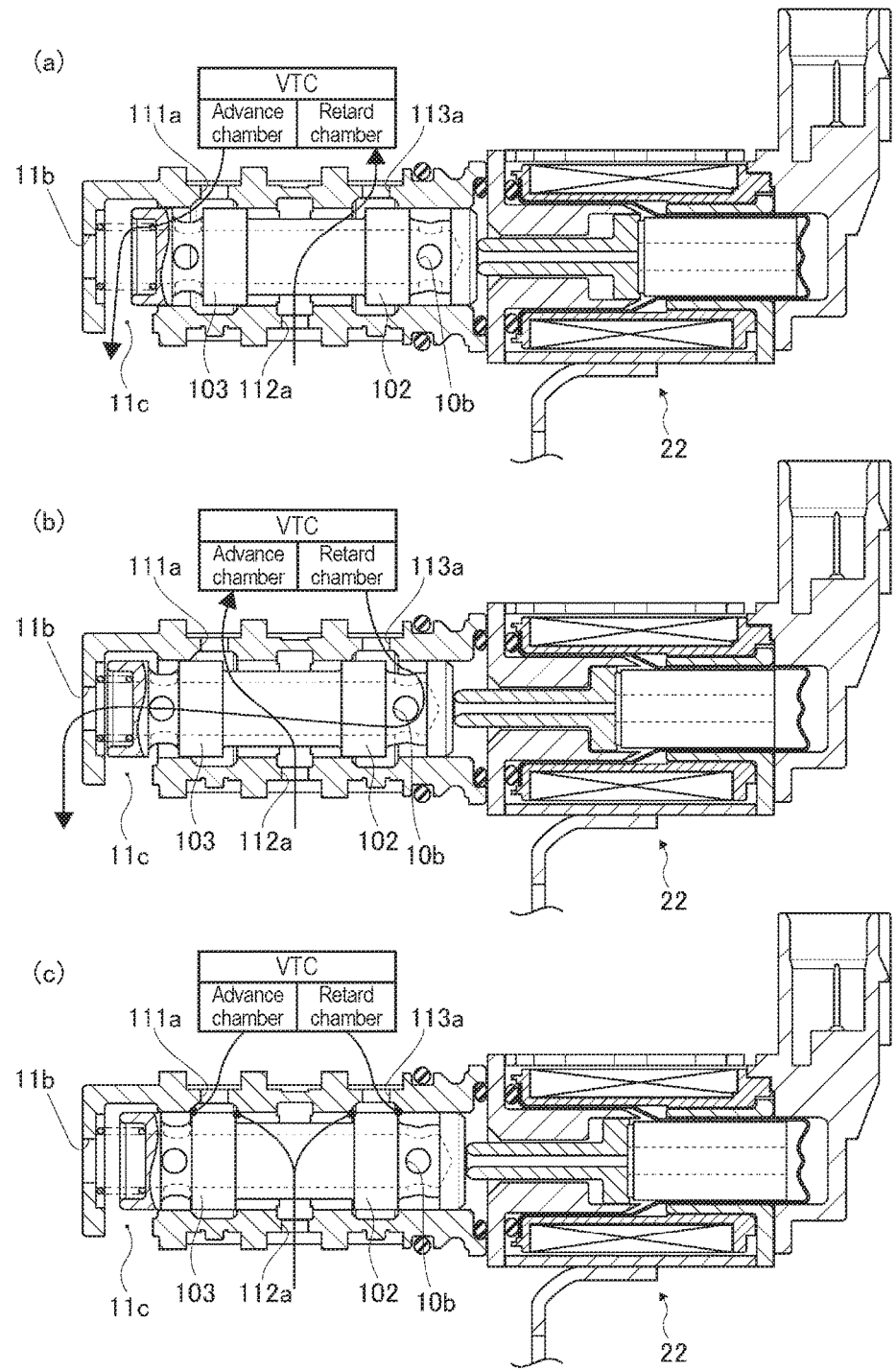
FIG. 5 is a schematic view showing the relationship between the operation of the electromagnetic valve and the supply and discharge of hydraulic fluid in the first embodiment.

FIG. 5 is a schematic view showing the relationship between the operation of the electromagnetic valve and the supply and discharge of hydraulic fluid in the first embodiment. FIG. 5(a) shows a retard shift, which is an operation toward the retard side. FIG. 5(b) shows an advance shift, which is an operation toward the advance side. FIG. 5(c) shows the electromagnetic valve when in a phase holding position.

When a retard shift command is output, as shown in FIG. 5(a), the control current is turned off, and the spool valve 10 moves toward a right end position in FIG. 5. Consequently, the inlet port 112a and the retard port 113a are communicated with each other, and the retard chamber Pr is supplied with hydraulic fluid. At the same time, the advance port 111a discharges hydraulic fluid from the advance chamber Pa to the outer periphery of the third stem 107. The hydraulic fluid flowing to the third stem 107 passes through the second through-hole 10c and is discharged from the discharge ports 11b and 11c.

Similarly, when an advance shift command is output, as shown in FIG. 5(b), a control current is output that can press down the spool valve 10 completely, and the spool valve 10 moves to a left end position in FIG. 5(b). Consequently, the inlet port 112a and the advance port 111a are communicated with each other, and the advance chamber Pa is supplied with hydraulic fluid. At the same time, the retard port 113a discharges hydraulic fluid from the retard chamber Pr to the outer periphery of the first stem 105. The hydraulic fluid flowing to the first stem 105 passes through the first through-hole 10b and the oil passage 10a and is discharged from the discharge ports 11b and 11c.

When a phase holding command is output, as shown in FIG. 5(c), the position of the spool valve 10 is held so that the second land portion 102 closes the retard port 113a, and that the third land portion 103 closes the advance port 111a. Consequently, the inlet port 112a does not communicate with any port, and both the retard passage L1 and the advance passage L2 are blocked. Accordingly, there is no increase or decrease in the amount of hydraulic fluid in the retard chamber Pr and the advance chamber Pa, and thus the phase is held.

(Regarding Filer Detent Structure)

Figure 6:
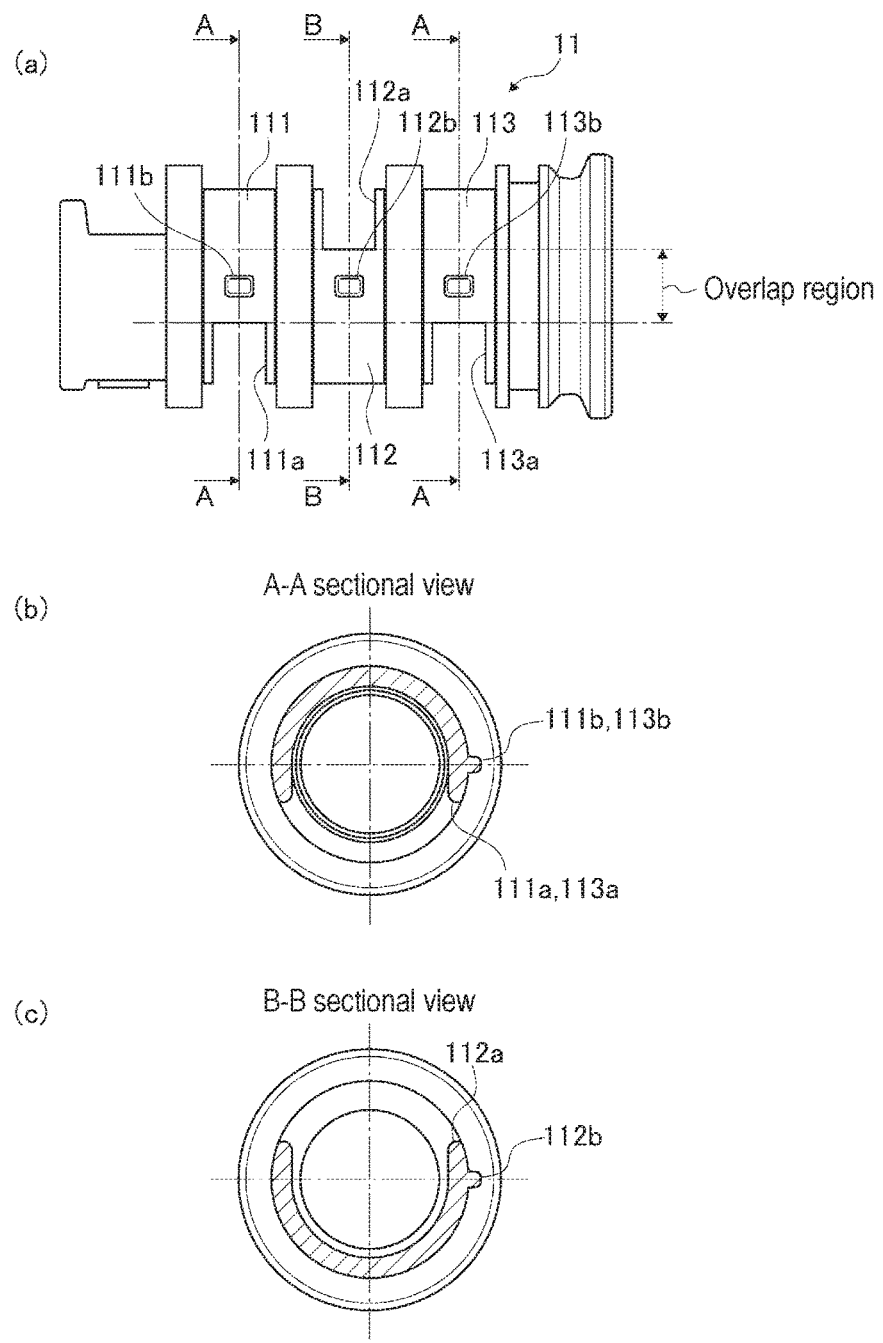
FIG. 6 shows side and sectional views of the valve body in the first embodiment.

Next, a filter detent structure will be explained. FIG. 6 shows side and sectional views of the valve body in the first embodiment. FIG. 6(a) is a side view. FIG. 6(b) is an A-A sectional view. FIG. 6(c) is a B-B sectional view. As shown in FIG. 6, the restraining portion b1 is a projection projecting radially outward of the valve body 11. When the axial direction of the valve body 11 is assumed to be the widthwise direction of each annular groove b0, the restraining portion b1 is formed in a substantially central region in the widthwise direction. In other words, the restraining portion b1 is not formed over the entire region in the widthwise direction of the annular groove b0 but formed in a part in the widthwise direction thereof. Thus, the restraining portion b1 is narrower in width than the filter F. For example, when the valve body 11 is made of a sintered material or the like and annular grooves, etc. are formed by post-machining, it is necessary, in order to form the restraining portion b1 over the entire width, to machine the side surfaces of the annular groove b0 individually with a special jig, which may cause an increase in machining cost. In contract, when the restraining portion b1 is locally formed in a widthwise central region of the annular groove b0, the restraining portion b1 can be formed by locally leaving an unshaved portion when machining the central region of the annular groove b0 after machining the side surfaces thereof. Thus, the increase in machining cost can be suppressed.

In addition, the restraining portion b1 in the first embodiment, which has a projection shape, can avoid accumulation of contamination or other foreign matter at the restraining portion b1. In addition, the restraining portion b1 is provided at the circumferential end edge of each of the ports 111a, 112a and 113a. The restraining portions b1 are provided at respective positions overlapping each other as viewed in the axial direction of the valve body 11, thereby allowing the filters F1, F2 and F3 to be easily assembled from one side. In other words, the restraining portions b1 are provided at respective positions at which, as viewed from the radial direction, an imaginary line parallel to the axial direction does not overlap any of the ports. In further other words, the valve body 11 has a region where, as viewed from the radial direction, an imaginary line parallel to the axial direction overlaps the bottoms of the annular grooves b0 (the region will hereinafter be referred to as "the overlap region"), and the restraining portions b1 are provided in the overlap region. Therefore, even if the opening positions (or the radial opening directions) of the ports 111a, 112a and 113a differ from each other among the annular grooves b0, the ease of assembly of filters is improved by providing the restraining portions b1 in the overlap region. It should be noted that the valve body 11 in the first embodiment also has a second overlap region at a position radially opposing the overlap region where the restraining portions b1 are provided.

Figure 7:
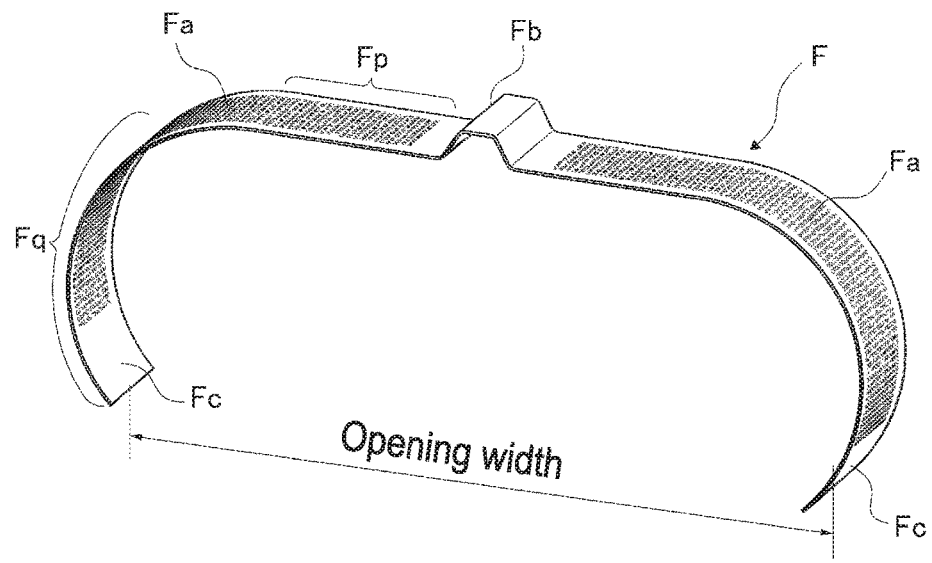
FIG. 7 is an illustration showing a filter in the first embodiment.
Figure 7:
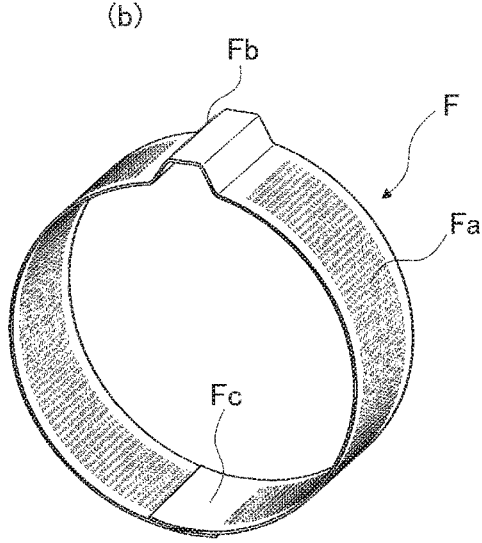
Figure 8:
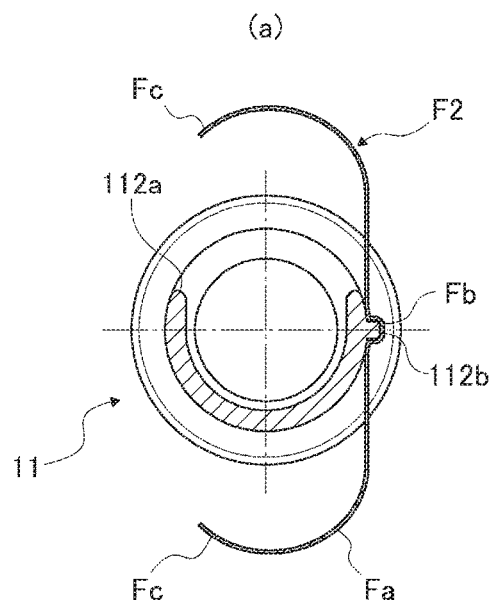
FIG. 8 is an illustration showing the way in which the filter is assembled to the valve body in the first embodiment.
Figure 8:
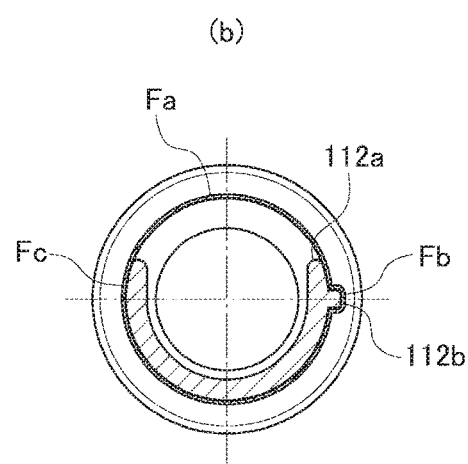

FIG. 7 is an illustration showing a filter in the first embodiment. FIG. 8 is an illustration showing the way in which a filter is assembled to the valve body in the first embodiment. All the filters F1, F2 and F3 (hereinafter occasionally referred to as "the filter F") are of the same configuration and each formed from a single metal sheet of uniform width. FIG. 7(a) shows the state of the filter F before being assembled to the valve body 11. FIG. 7(b) shows the state of the filter F after being assembled to the valve body 11. The filter F is wound to cover an associated one of the ports 111a, 112a and 113a and has mesh portions Fa for filtering hydraulic fluid, a mask portion Fb covering the restraining portion b1, and joint portions Fc superimposed and laser-welded together when the filter F is assembled to the valve body 11. The mesh portions Fa each have a plurality of very small holes formed by an etching process. It should be noted that press working or the like may be used to form a plurality of holes, and that the method of forming holes is not particularly limited. Further, the mask portion Fb and the joint portions Fc are not formed with meshes but left as unprocessed portions of the sheet-shaped member, thereby ensuring the mechanical strength.

The mask portion Fb is a bent portion formed by bending the sheet-shaped member. The mask portion Fb can be said to be a projecting portion projecting radially outward of the valve body 11 when the filter F is assembled to the valve body 11. The mesh portions Fa are formed symmetrically at both sides of the mask portion Fb so that no matter in which radial direction the associated one of the ports 111a, 112a and 113a is open, either of the mesh portions Fa covers the associated one of the ports 111a, 112a and 113a without fail when the filter F is wound around the valve body 11 with the mask portion Fb aligned in position with the restraining portion b1. In other words, none of the ports 111a, 112a and 113a overlaps any portion of the filter F where no meshes are formed, such as the mask portion Fb and the joint portions Fc, except either of the mesh portions Fa.

The filter F, when in its natural state before being assembled, has a substantially flat sheet-shaped region Fp extending over a predetermined region centered at the mask portion Fb, and a curved region Fq extending from a halfway point of each mesh portion Fa to the associated joint portion Fc. The curved region Fq is curved substantially in the same shape as the outer peripheral shape of each annular groove b0 of the valve body 11. The filter F is formed so that the opening width between the joint portions Fc is wider than the overall width of the valve body 11 (see FIG. 7(a)).

Further, when the filter F is to be assembled to the valve body 11, the filter F is placed so that the mask portion Fb covers the restraining portion b1, and with the mask portion Fb used as an installation reference, the mesh portions Fa are wound on the valve body 11. At this time, because the widthwise ends of the mask portion Fb are open, the filter F can be assembled to the valve body 11 easily without the need to strictly perform alignment in the axial direction of the valve body 11. Further, as shown in FIG. 8(a), there is a slight clearance between the restraining portion 112b and the mask portion Fb, and this allows the filter F to be assembled to the valve body 11 without the need to strictly perform alignment in the circumferential direction of the valve body 11. In other words, because the filter F is formed so that the area of each mesh portion Fa is sufficiently wider than the opening area of each of the ports 111a, 112a and 113a, even if the filter F and the valve body 11 move or rotate relative to each other slightly by an amount corresponding to the above-described clearance, each of the ports 111a, 112a and 113a can be covered with only the mesh portion Fa.

(Regarding Assembly of Filters)

Figure 9:
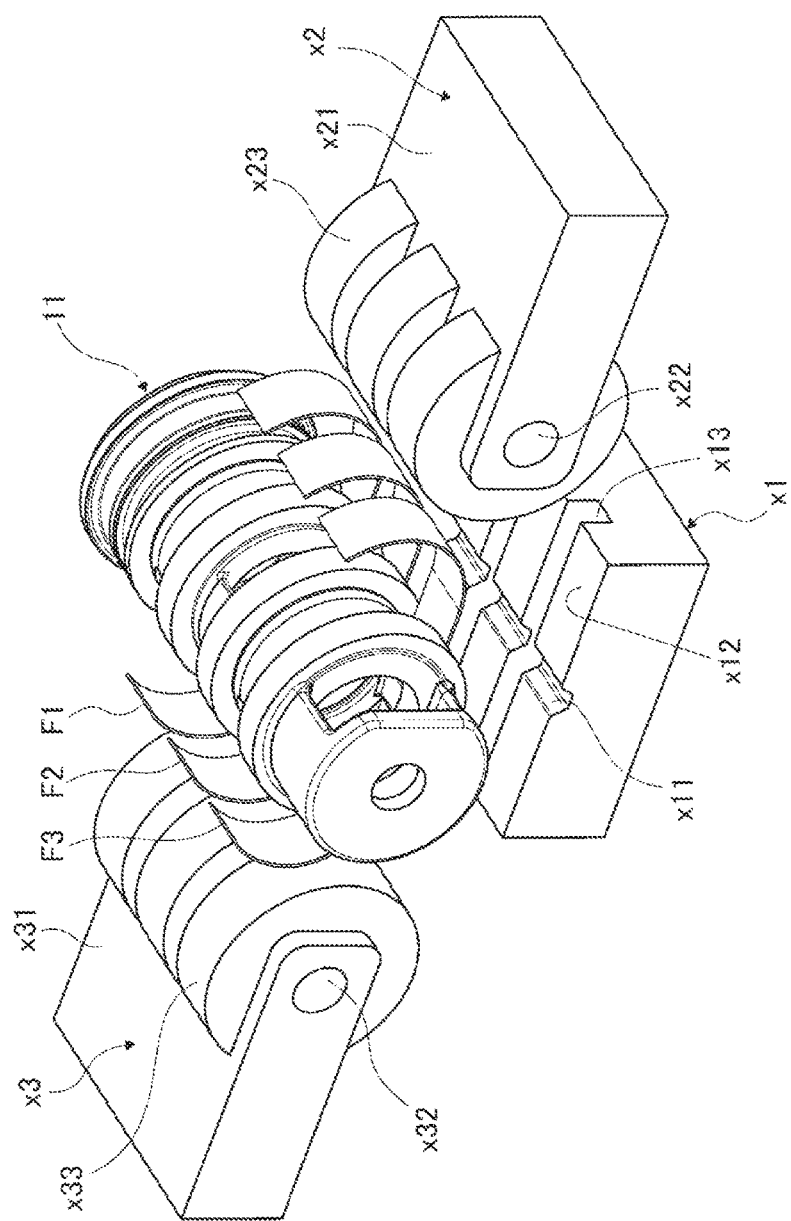
FIG. 9 is a schematic view showing an assembling process to assemble the filters to the valve body in the first embodiment.

FIG. 9 is a schematic view showing an assembling process performed when the filters are to be assembled to the valve body in the first embodiment. A first jig x1 has U-shaped grooves x11 into which the mask portions Fb of the filters fit, respectively, plane portions x12 on which the sheet-shaped regions Fp of the filters are placed, respectively, and U-shaped grooves x13 into which the peripheral walls 11a of the valve body 11 fit, respectively. A second jig x2 and a third jig x3 have roller retaining portions x21 and x31, roller shafts x22 and x32, and rollers x23 and x33, respectively. The rollers x23 and x33 each have a width slightly narrower than the width of the annular groove b0.

At a first step, the filters F in their natural state are disposed so that the mask portions Fb of the filters F fit into the U-shaped grooves x11, respectively, and the valve body 11 is placed on the filters F. At this time, the valve body 11 is placed so that the restraining portions b1 coincide with the positions of the U-shaped grooves x11 in terms of the radial position of the valve body 11, and that the peripheral walls 11a of the valve body 11 coincide with the positions of the U-shaped grooves x13 in terms of the axial position of the valve body 11. Consequently, an appropriate alignment is made between the restraining portions b1 of the valve body 11 and the mask portions Fb of the filters F.

At a second step, the filters F are pushed in by the second jig x2 from one side of the valve body 11. Consequently, the rollers x23 abut against the curved regions Fq of the filters F, and while doing so, the rollers x23 curve the sheet-shaped regions Fp of the filters F. As a result, one joint portion Fc of each filter F is placed to cover a position of the valve body 11 that substantially opposes the associated restraining portion b1 of the valve body 11. Next, the filters F are pushed in by the third jig x3 from the other side of the valve body 11. Consequently, the rollers x33 abut against the curved regions Fq of the filters F, and while doing so, the rollers x33 curve the sheet-shaped regions Fp of the filters F. As a result, the other joint portion Fc of each filter F is placed to cover the one joint portion Fc. Thus, as viewed in the radial direction of the valve body 11, the joint portions Fc at the opposite ends of each filter F overlap each other. Further, because each joint portion Fc belongs to the associated curved region Fq, as viewed in the axial direction of the valve body 11, the two joint portions Fc are superimposed on one another without a gap therebetween without the need to press the joint portions Fc in the radial direction. It should be noted that the overlap range in which the joint portions Fc at the opposite ends of each filter F overlap each other is a region narrower than the second overlap region of the valve body 11 radially opposing the overlap region where the restraining portions b1 are provided. Accordingly, the joint portion overlap region cannot close any of the ports 111a, 112a and 113a. In this state, a predetermined area of the superimposed joint portions is laser-welded together, thus completing the assembly of the filters F. It should be noted that although in the first embodiment a plurality of filters F are simultaneously assembled by automation, the filters F may be assembled individually, or alternatively, may be assembled by hand.

Advantages of First Embodiment

As has been explained above, the electromagnetic valve EV described in the first embodiment offers the following advantages:

(1) The electromagnetic valve EV includes the following elements: a valve body 11 having a plurality of ports 111a, 112a and 113a (opening portions) formed in a cylindrical peripheral wall 11a at respective positions spaced from each other in an axial direction of the peripheral wall 11a to allow hydraulic fluid to flow therethrough in a radial direction of the peripheral wall 11a, the valve body 11 further having annular grooves b0 formed on the outer periphery of the peripheral wall 11a at axially spaced positions at which the ports 111a, 112a and 113a are formed, respectively, and a restraining portion b1 provided in each of the annular grooves b0; a spool valve 10 axially movably provided in the peripheral wall 11a to open and close the ports 111a, 112a and 113a according to the moving position of the spool valve 10; and filters F wound to cover the ports 111a, 112a and 113a, respectively, the filters F each having a mesh portion Fa for filtering the hydraulic fluid and a mask portion Fb covering the restraining portion b1.

Accordingly, when the filters F are to be wound in the annular grooves b0, respectively, each filter F can be assembled simply by aligning the restraining portion b1 and the mask portion Fb with each other. Thus, the electromagnetic valve EV can exhibit an axially positioning function and detent function for the filters F without degrading the assemblability of the filters F.

(2) When the axial direction of the peripheral wall 11a is assumed to be the widthwise direction of the mask portion Fb, the widthwise ends of the mask portion Fb are open.

Accordingly, when the filters F are to be assembled to the valve body 11, the filters F can be assembled without the need to increase the accuracy of positioning in the widthwise direction so much. Further, because both the widthwise ends of the mask portion Fb are open, the mask portion Fb can be formed simply by forming a bent portion at the time of manufacture; therefore, the ease of manufacture can be ensured.

(3) The restraining portion b1 is a projection projecting radially outward of the valve body 11, and the mask portion Fb is an outwardly projecting portion projecting radially outward of the valve body 11 to cover the projection.

Thus, because the restraining portion b1 is formed radially outward of the valve body 11, the restraining portion b1 can be formed so as not to exert any influence on other regions as compared to a structure in which the restraining portion b1 is formed radially inward of the valve body 11. In addition, it is possible to avoid accumulation of contamination or the like at the restraining portion b1 and hence possible to increase the operation stability of the electromagnetic valve EV.

(4) The mesh portion Fa is provided at each of two positions facing each other in the circumferential direction of the valve body 11 across the mask portion Fb.

Accordingly, when each filter F is to be assembled to the valve body 11, the filter F can be assembled easily without the need to confirm the orientation of the filter F in the right-and-left direction.

(5) The restraining portion b1 (projection) is provided at a circumferential end edge of each of the ports 111a, 112a and 113a.

Accordingly, when each filter F is to be assembled to the valve body 11, the mesh portion Fa can be positioned over the associated port simply by aligning the mask portion Fb with the position of the restraining portion b1. Thus, the ease of assembly can be ensured.

(6) The plurality of restraining portions b1 (projections) are provided at respective positions overlapping each other in the axial direction of the peripheral wall 11a.

Accordingly, when the filters F are to be assembled to the valve body 11, the filters F can be assembled from one side in the circumferential direction. Thus, the ease of assembly can be ensured.

(7) The restraining portion b1 (projection) is narrower in width than each of the filters F.

Accordingly, when forming the restraining portion b1, it is possible to ensure the ease of machining and to relax the dimensional accuracy.

(8) There is a clearance provided between the mask portion Fb and the restraining portion b1 (projection).

Accordingly, it is possible to relax the dimensional accuracy and to ensure the ease of manufacture and the ease of assembly while ensuring the detent function.

(9) The filters F are each formed from a metal sheet.

Accordingly, the filters F can be manufactured easily by etching process or press working.

(10) Each filter F has a welded joint portion at a position radially opposing the associated restraining portion b1.

Accordingly, the filters F can be secured firmly.

(11) When the axial direction of the peripheral wall 11a is assumed to be the widthwise direction of the filters F, the filters F each have a substantially uniform width.

Accordingly, each filter F can be assembled in the associated annular groove b0 simply by aligning the restraining portion b1 and the mask portion Fb with each other. Thus, it is possible to relax the positioning accuracy at other regions and hence possible to ensure the ease of manufacture and the ease of assembly.

(12) The electromagnetic valve EV includes the following elements: a valve body 11 having a plurality of ports 111a, 112a and 113a (opening portions) in a cylindrical peripheral wall 11a at respective positions spaced from each other in an axial direction of the peripheral wall 11a to allow hydraulic fluid to flow therethrough in a radial direction of the peripheral wall 11a, the valve body 11 further having circumferentially continuous annular grooves b0 at axially spaced positions on the peripheral wall 11a at which the ports 111a, 112a and 113a are formed, respectively; a spool valve 10 axially movably provided in the valve body 11 to open and close the ports 111a, 112a and 113a according to the moving position of the spool valve 10; and filters F wound in the annular grooves b0 to cover the ports 111a, 112a and 113a, respectively, the filters F extending along and covering restraining portions b1 provided in the annular grooves b0, respectively, the restraining portions b1 being projections projecting radially outward of the peripheral wall 11a, thereby restraining circumferential movement of the filters F relative to the valve body 11.

Accordingly, when the filters F are to be wound in the annular grooves b0, respectively, each filter F can be assembled simply by aligning the restraining portion b1 and the mask portion Fb with each other. Thus, the electromagnetic valve EV can exhibit an axially positioning function and detent function for the filters F without degrading the assemblability of the filters F.

(13) An internal-combustion engine valve timing control apparatus includes the following elements: a housing 6 (driving rotary member) to which rotational force is transmitted from a crankshaft CS, the housing 6 having an operation chamber formed therein; a cam shaft 2 (driven rotary member) rotatably accommodated in the housing 6 to divide the operation chamber into an advance chamber Pa and a retard chamber Pr, the cam shaft 2 being rotated relative to the housing 6 toward an advance side or a retard side in response to supply and discharge of hydraulic fluid into and from the operation chambers Pa and Pr; an electromagnetic valve EV (hydraulic pressure control valve) controlling supply and discharge of hydraulic fluid delivered from a pump 8 into and from the operation chambers Pa and Pr; and an electromagnetic solenoid 20 (actuator) operating the electromagnetic valve EV. The electromagnetic valve EV includes the following elements: a valve body 11 having a plurality of ports 111a, 112a and 113a (opening portions) formed in a cylindrical peripheral wall 11a at respective positions spaced from each other in an axial direction of the peripheral wall 11a to allow hydraulic fluid to flow therethrough in a radial direction of the peripheral wall 11a, the valve body 11 further having annular grooves b0 formed on an outer periphery of the peripheral wall 11a at axially spaced positions at which the ports 111a, 112a and 113a are formed, respectively, and a restraining portion b1 provided in each of the annular grooves b0; a spool valve 10 axially movably provided in the peripheral wall 11a to open and close the ports 111a, 112a and 113a according to the moving position of the spool valve 10; and filters F wound to cover the ports 111a, 112a and 113a, respectively, the filters F each having a mesh portion Fa for filtering the hydraulic fluid and a mask portion Fb covering the restraining portion b1.

That is, the electromagnetic valve EV, which is applied to the internal-combustion engine valve timing control apparatus, has the valve body 11 equipped with the filters F. When the filters F are to be wound in the annular grooves b0 of the valve body 11, each filter F can be assembled simply by aligning the restraining portion b1 and the mask portion Fb with each other. Thus, the electromagnetic valve EV can exhibit an axially positioning function and detent function for the filters F without degrading the assemblability of the filters F.

Second Embodiment

Figure 10:
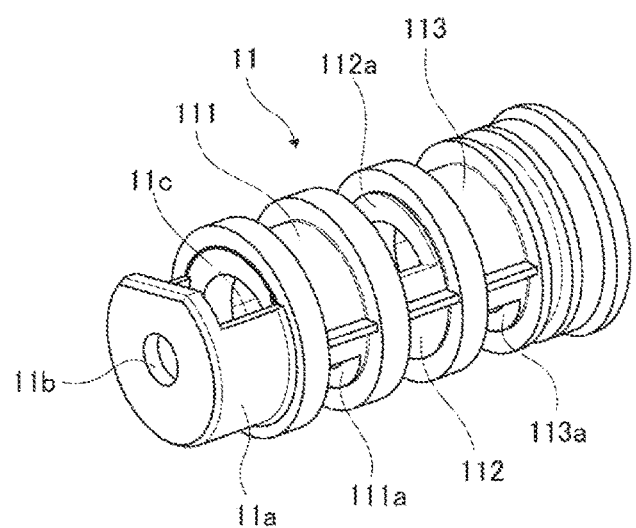
FIG. 10 is a perspective view of a valve body in a second embodiment.
Figure 11:
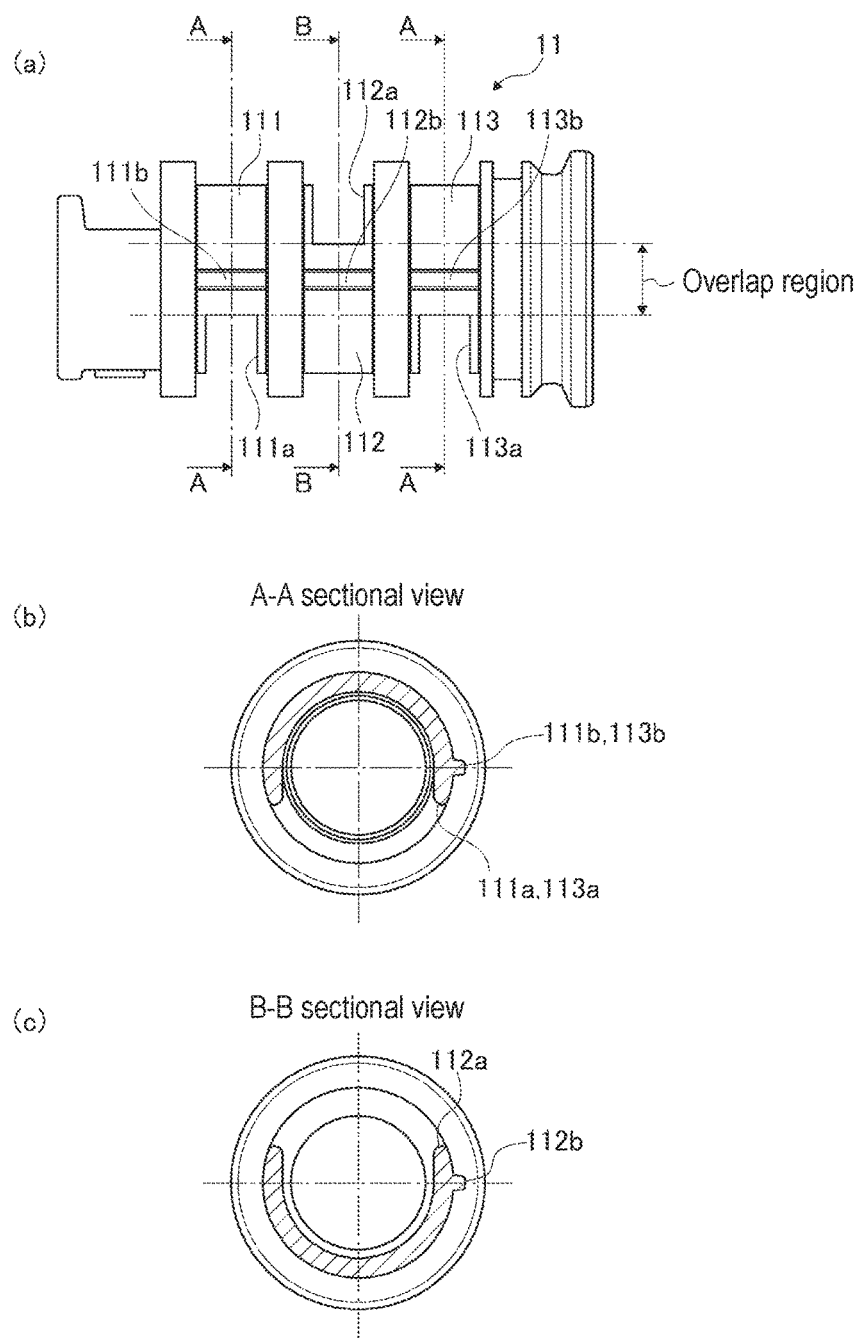
FIG. 11 shows side and sectional views of the valve body in the second embodiment.

Next, a second embodiment will be explained. The basic structure of the second embodiment is the same as that of the first embodiment. Therefore, only the point in which the second embodiment differs from the first embodiment will be explained. FIG. 10 is a perspective view of a valve body in the second embodiment. FIG. 11 shows side and sectional views of the valve body in the second embodiment. FIG. 11(a) is a side view. FIG. 11(b) is an A-A sectional view. FIG. 11(c) is a B-B sectional view. The second embodiment differs from the first embodiment as follows. In the first embodiment, the restraining portion b1 is formed in a substantially central region in the widthwise direction of the annular groove b0. In contrast, the restraining portion b1 in the second embodiment is formed over the entire region in the widthwise direction of the annular groove b0. With this structure, if the filter F is subjected to a force causing the filter F to move relative to the valve body 11 in the circumferential direction, because the mask portion Fb and the restraining portion b1 contact each other over the entire region in the widthwise direction, the contact stress can be reduced, and the durability of the filter F can be improved.

Third Embodiment

Figure 12:
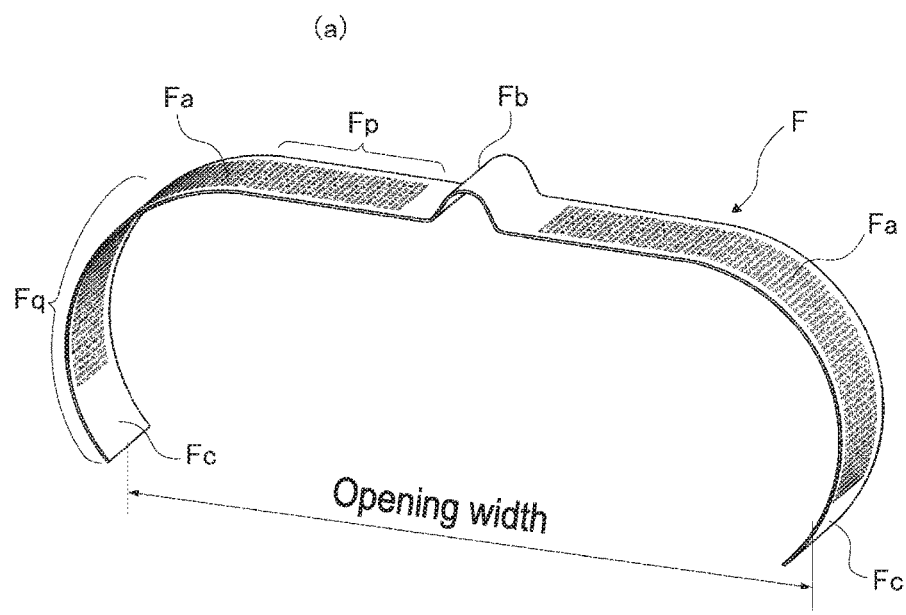
FIG. 12 is an illustration showing a filter in a third embodiment.
Figure 12:
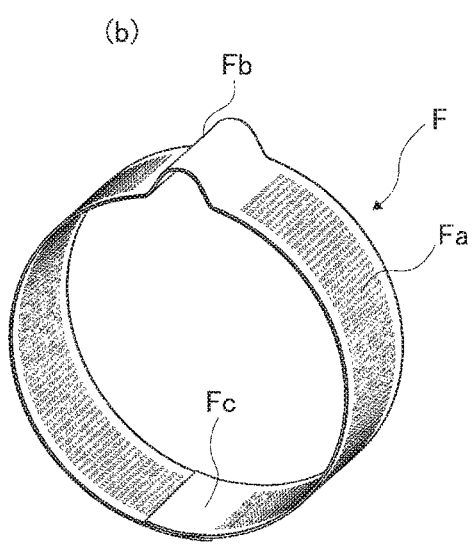

Next, a third embodiment will be explained. The basic structure of the third embodiment is the same as that of the first embodiment. Therefore, only the point in which the third embodiment differs from the first embodiment will be explained. FIG. 12 is an illustration showing a filter in the third embodiment. FIG. 12(a) shows the state of the filter before being assembled to the valve body 11. FIG. 12(b) shows the state of the filter after being assembled to the valve body 11. The third embodiment differs from the first embodiment as follows. The mask portion Fb in the first embodiment is a bent portion formed by bending a sheet-shaped member. In contrast, the mask portion Fb in the third embodiment is a curved portion having a wave-shaped cross-sectional configuration. Thus, the mask portion Fb is formed not by bending but by curving. Therefore, even if some force acts on the filter F, it is possible to avoid stress concentration and hence possible to improve the durability of the filter F.

Fourth Embodiment

Figure 13:
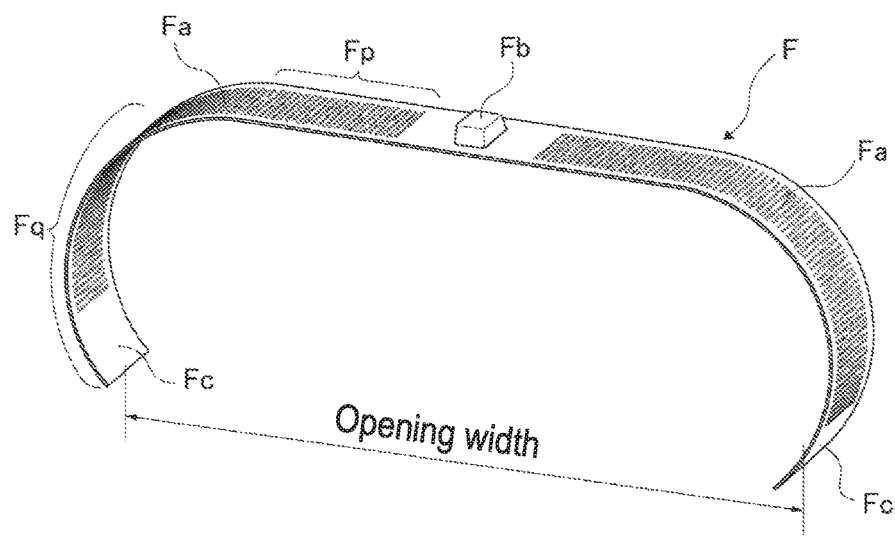
FIG. 13 is an illustration showing a filter in a fourth embodiment.

Next, a fourth embodiment will be explained. The basic structure of the fourth embodiment is the same as that of the first embodiment. Therefore, only the point in which the fourth embodiment differs from the first embodiment will be explained. FIG. 13 is an illustration showing a filter in the fourth embodiment. The fourth embodiment differs from the first embodiment as follows. The mask portion Fb in the first embodiment is open at both ends in the widthwise direction thereof. In contrast, the mask portion Fb in the fourth embodiment is locally formed as a projection in conformity to the configuration of the restraining portion b1 and closed at both ends thereof in the axial direction. Thus, it is possible to restrain relative movement between the valve body 11 and the filter F also in the axial direction and hence possible to stabilize the assembled state of the valve body 11 and the filter F.

Fifth Embodiment

Figure 14:
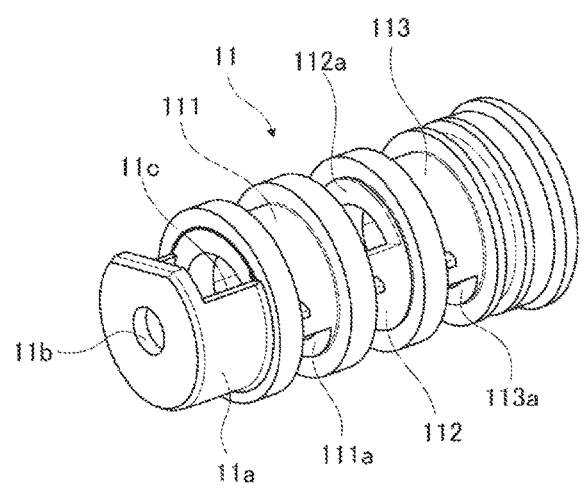
FIG. 14 is a perspective view of a valve body in a fifth embodiment.
Figure 15:
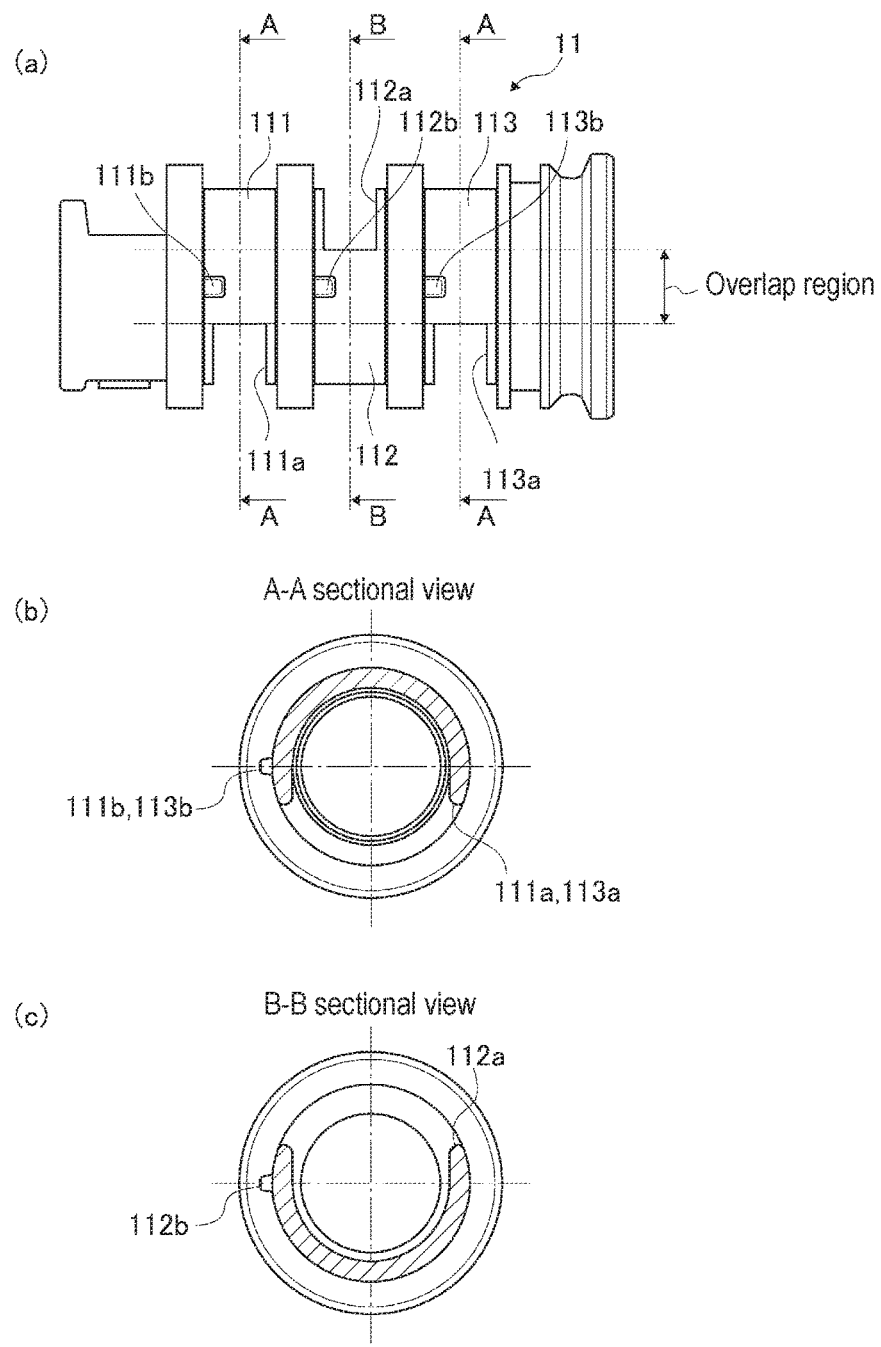
FIG. 15 shows side and sectional views of the valve body in the fifth embodiment.
Figure 16:
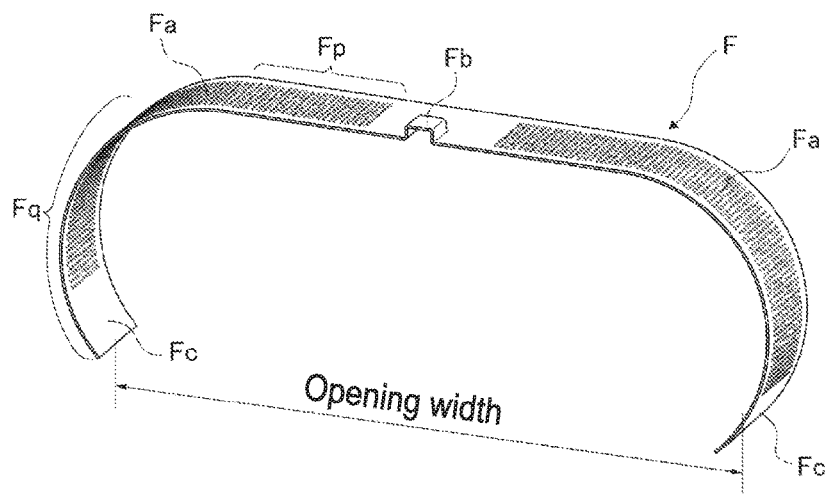
FIG. 16 is an illustration showing a filter in the fifth embodiment.

Next, a fifth embodiment will be explained. The basic structure of the fifth embodiment is the same as that of the first embodiment. Therefore, only the point in which the fifth embodiment differs from the first embodiment will be explained. FIG. 14 is a perspective view of a valve body in the fifth embodiment. FIG. 15 shows side and sectional views of the valve body in the fifth embodiment. FIG. 16 is an illustration showing a filter in the fifth embodiment. FIG. 15 (a) is a side view. FIG. 15(b) is an A-A sectional view. FIG. 15(c) is a B-B sectional view. The fifth embodiment differs from the first embodiment as follows. In the first embodiment, the restraining portion b1 is formed in a substantially central region in the widthwise direction of the annular groove b0. In contrast, the restraining portion b1 in the fifth embodiment is formed along a sidewall on one side of the annular groove b0. In conformity to the configuration of the restraining portion b1, the mask portion Fb of the filter F is formed in the shape of a projection open only to the sidewall on one side of the annular groove b0. Thus, it is possible to obtain operational advantages similar to those of the first embodiment.

Sixth Embodiment

Figure 17:
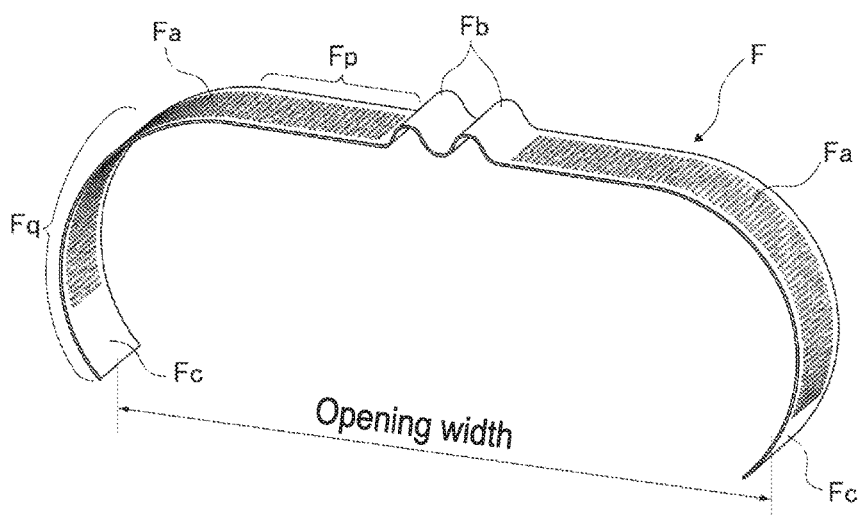
FIG. 17 is an illustration showing a filter in a sixth embodiment.

Next, a sixth embodiment will be explained. The basic structure of the sixth embodiment is the same as that of the third embodiment. Therefore, only the point in which the sixth embodiment differs from the third embodiment will be explained. FIG. 17 is an illustration showing a filter in the sixth embodiment. The sixth embodiment differs from the third embodiment as follows. In the third embodiment, positioning is performed by using one mask portion Fb. In contrast, in the sixth embodiment, there are provided a plurality (two) of mask portions Fb. With a structure having two mask portions Fb for one restraining portion b1 provided on the valve body 11, even if the filter F is assembled to the valve body 11 with some relative position displacement therebetween, positioning can be completed when either one of the two mask portions Fb is fitted to the restraining portion b1. Thus, the ease of assembly can be further improved. It should be noted that there may be formed a plurality of restraining portions b1 on the valve body 11. In such a case, positioning can be performed by using a plurality of combinations each comprising a restraining portion b1 and a mask portion Fb. Consequently, there is a reduction in contact stress acting between a restraining portion b1 and a mask portion Fb of each combination. Accordingly, the durability of the filter F can be improved.

As has been explained above, the sixth embodiment offers the following operational advantage:

(14) There are a plurality of mask portions Fb provided in the circumferential direction of the valve body 11.

Accordingly, the ease of assembly of the filter F can be further improved. It should be noted that although the sixth embodiment shows an example in which there are formed a plurality of mask portions Fb curved in a wave shape in cross section, a plurality of mask portions Fb in any other embodiment may also be provided in the circumferential direction. That is, if the restraining portion b1 is in the shape of a projection, the mask portion Fb is also in the shape of a projection. Therefore, if a plurality of mask portions Fb shown in the other embodiments are provided in the circumferential direction, there will indeed be one or more mask portions Fb that are not fitted to the restraining portion b1 but there will be no influence on other regions.

Seventh Embodiment

Figure 18:
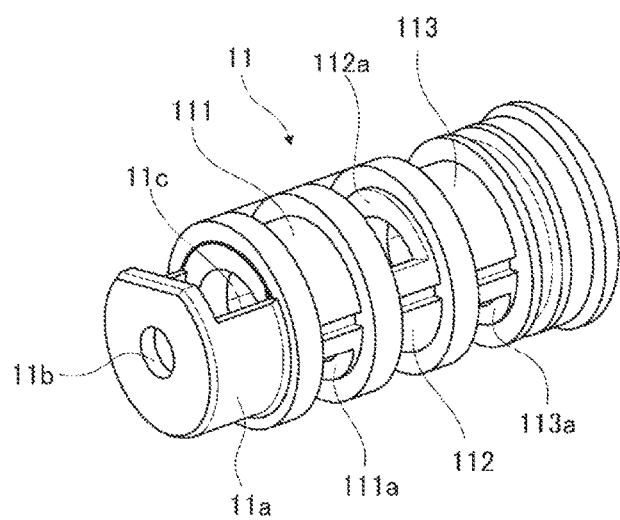
FIG. 18 is a perspective view of a valve body in a seventh embodiment.
Figure 19:
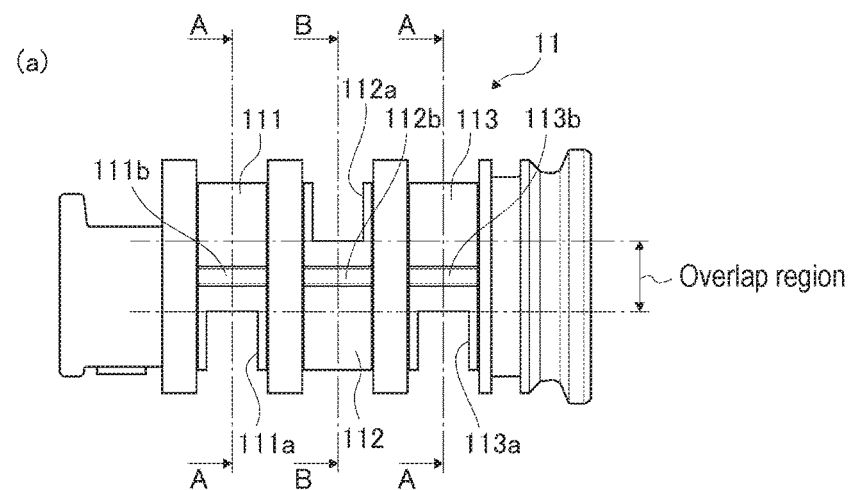
FIG. 19 shows side and sectional views of the valve body in the seventh embodiment.
Figure 19:
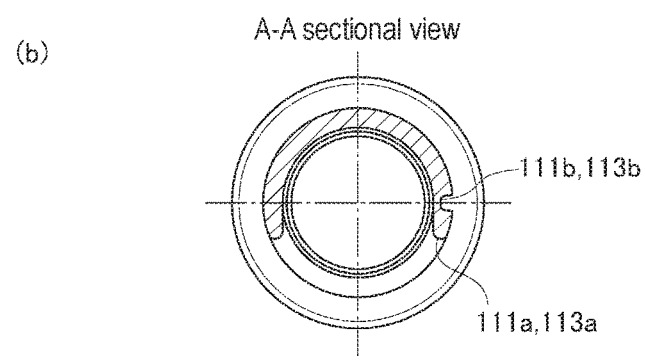
Figure 19:
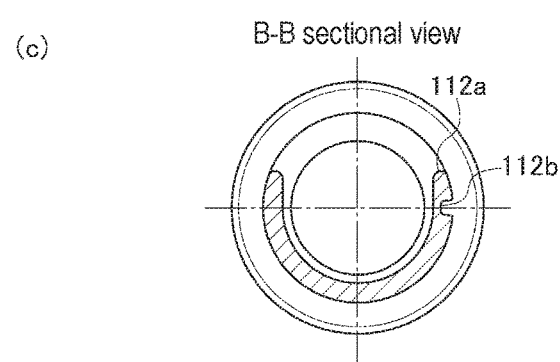

Next, a seventh embodiment will be explained. The basic structure of the seventh embodiment is the same as that of the first embodiment. Therefore, only the point in which the seventh embodiment differs from the first embodiment will be explained. The seventh embodiment differs from the first embodiment as follows. In the first embodiment, the restraining portion b1 is formed in the shape of a projection. In contrast, in the seventh embodiment, the restraining portion b1 is formed in the shape of a recess. FIG. 18 is a perspective view of a valve body in the seventh embodiment. FIG. 19 shows side and sectional views of the valve body in the seventh embodiment. FIG. 19(a) is a side view. FIG. 19(b) is an A-A sectional view. FIG. 19(c) is a B-B sectional view. As shown in FIG. 19, the restraining portion b1 is a recess projecting radially inward of the valve body 11. When the axial direction of the valve body 11 is assumed to be the widthwise direction of each annular groove b0, the restraining portion b1 is formed over the entire width in the widthwise direction. It should be noted that the recess may be locally formed in a specific widthwise region.

Figure 20:
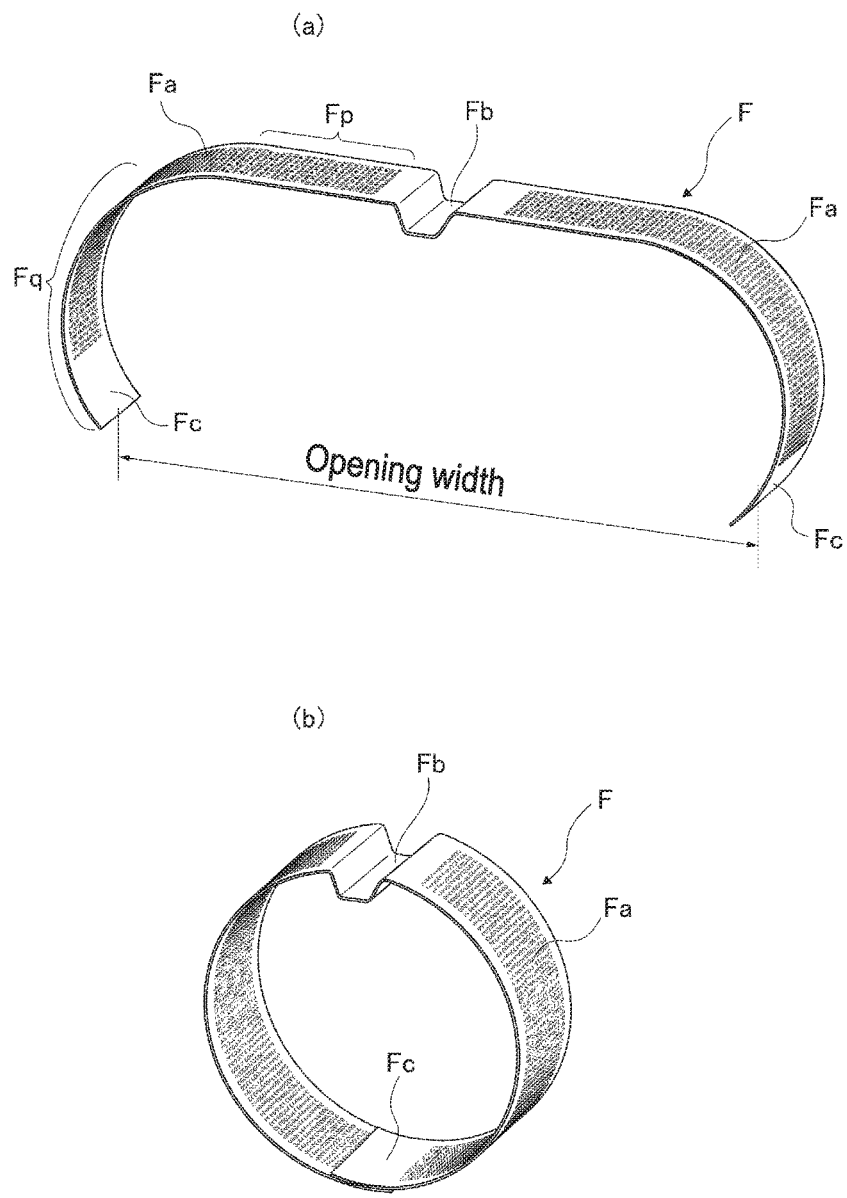
FIG. 20 is an illustration showing a filter in the seventh embodiment.
Figure 21:
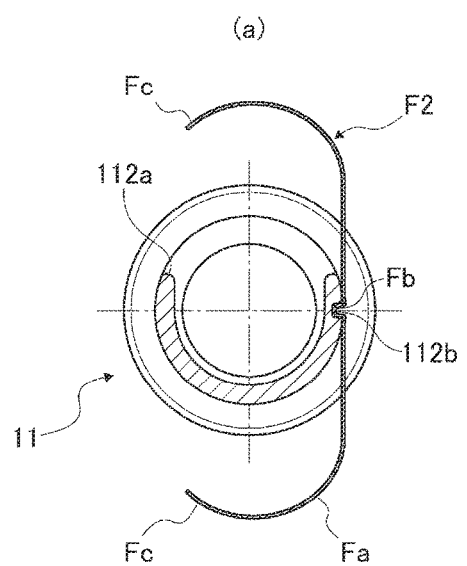
FIG. 21 is an illustration showing the way in which the filter is assembled to the valve body in the seventh embodiment.
Figure 21:
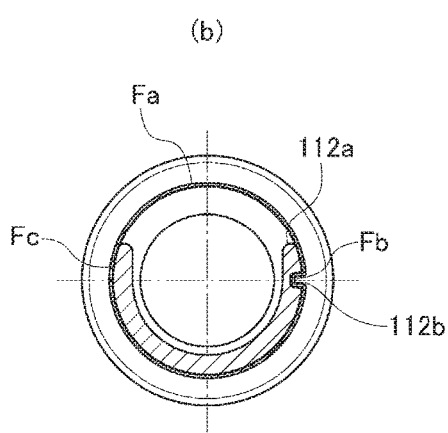

FIG. 20 is an illustration showing a filter in the first embodiment. FIG. 21 is an illustration showing the way in which the filter F is assembled to the valve body in the seventh embodiment. All the filters F1, F2 and F3 (hereinafter occasionally referred to as "the filter F") are of the same configuration and each formed from a single metal sheet of uniform width. FIG. 21(a) shows the state of the filter F before being assembled to the valve body 11. FIG. 21(b) shows the state of the filter F after being assembled to the valve body 11. The mask portion Fb is a bent portion formed by bending a sheet-shaped member, which can be formed easily by press working. It should be noted that the mask portion Fb can be said to be a recess projecting radially inward of the valve body 11 when the filter F has been assembled to the valve body 11. Although the recess in the seventh embodiment is formed over the entire width, the recess may be locally formed in a specific widthwise region.

As has been explained above, the seventh embodiment offers the following advantages:

(15) The restraining portion b1 is a recess recessed radially inward of the valve body 11, and the mask portion Fb is an inwardly projecting portion extending along and covering the recess, which is the restraining portion b1.

Thus, because the restraining portion b1 is formed radially inward of the valve body 11, the restraining portion b1 can be formed so as not to exert any influence on the flow of hydraulic fluid in the annular groove b0 as compared to a structure in which the restraining portion b1 is formed radially outward of the valve body 11.

(16) When the axial direction of the peripheral wall 11a is assumed to be the widthwise direction of the filter F, the mask portion Fb may be a recess provided in a widthwise central region of the filter F.

Thus, it is possible to reduce the influence on the flow of hydraulic fluid in the annular groove b0 while exhibiting an axial positioning function and detent function without degrading the ease of assembly of the filter F.

Other Embodiments

Although the present invention has been explained on the basis of some embodiments, the present invention is not limited to the foregoing embodiments, but other structures may also be adopted. For example, in the first embodiment, the present invention is employed in a hydraulic pressure control valve of an internal-combustion engine valve timing control apparatus. However, the present invention may be employed in a variable compression ratio mechanism for varying the compression ratio of an internal-combustion engine. Further, the combinations of the mask portion and the restraining portion are not limited to those shown in the foregoing embodiments, but the mask and restraining portions of the foregoing embodiments may be combined appropriately.

Although only some exemplary embodiments of the present invention have been described above, those skilled in the art will readily appreciate that various changes or improvements can be made to the exemplary embodiments without materially departing from the novel teaching and advantages of the present invention. Accordingly, all such changes or improvements are intended to be included within the scope of the present invention. The foregoing embodiments may be combined at will.

The present application claims priority to Japanese Patent Application No. 2015-118920 filed on Jun. 12, 2015. The entire disclosure of Japanese Patent Application No. 2015-118920 filed on Jun. 12, 2015 including specification, claims, drawings and summary is incorporated herein by reference in its entirety.

REFERENCE SIGNS LIST

2: cam shaft; 3: phase change mechanism; 4: hydraulic pressure supply-discharge device; 5: electronic control unit; 6: housing; 6a: timing sprocket; 6b: shoes; 7: vane rotor; 7a: annular proximal portion; 7b: vanes; 7c: lock mechanism; 8: pump; 9: oil pan; 10: spool valve; 11: valve body; 11a: peripheral wall; 11b, 11c: discharge ports; 12: coil spring; 20: electromagnetic solenoid; 111a: advance port; 112a: inlet port; 113, 112, 111: annular grooves; 113a: retard port; b0: annular groove; b1: restraining portion; CS: crankshaft; EV: electromagnetic valve; F: filter; Fa: mesh portion; Fb: mask portion; Fc: joint portion; L0: suction passage; L1: retard passage; L2: advance passage; L3: inlet passage; L4: drain passage; Pa: advance chamber; Pr: retard chamber; and TC: timing chain.

The invention claimed is:
1. A hydraulic pressure control valve comprising:
a valve body including a cylindrical peripheral wall, a plurality of opening portions formed in the peripheral wall at respective positions spaced from each other in an axial direction of the peripheral wall to allow hydraulic fluid to flow therethrough in a radial direction of the peripheral wall, annular grooves formed on an outer periphery of the peripheral wall at axially spaced positions at which the opening portions are formed, respectively, and a restraining portion provided in each of the annular grooves;
a spool valve axially movably provided in the peripheral wall to open and close at least one of the opening portions according to a moving position of the spool valve; and
filters wound around the peripheral wall to cover the opening portions, respectively, the filters each including a mesh portion for filtering the hydraulic fluid and a mask portion covering the restraining portion,
wherein when the axial direction of the peripheral wall is assumed to be a widthwise direction of the mask portion, widthwise ends of the mask portion are open;
wherein the restraining portion is a projection projecting radially outward of the valve body; and
wherein the mask portion is an outwardly projecting portion projecting radially outward of the valve body to cover the projection.
2. The hydraulic pressure control valve of claim 1, wherein the mesh portion is provided at each of two positions facing each other in a circumferential direction of the valve body across the mask portion.
3. The hydraulic pressure control valve of claim 2, wherein the projection is provided at a circumferential end edge of an associated one of the opening portions.
4. The hydraulic pressure control valve of claim 3, wherein a plurality of projections are provided at respective positions overlapping each other as viewed in the axial direction of the peripheral wall.

5. The hydraulic pressure control valve of claim 1, wherein the projection is narrower in width than each of the filters.
6. The hydraulic pressure control valve of claim 1, wherein there is a clearance provided between the mask portion and the projection.
7. The hydraulic pressure control valve of claim 1, wherein there are a plurality of the outwardly projecting portions provided in a circumferential direction of the valve body.
8. The hydraulic pressure control valve of claim 1, wherein when the axial direction of the peripheral wall is assumed to be a widthwise direction of each of the filters, the mask portion is a recess provided in a widthwise central region of the respective filter.
9. The hydraulic pressure control valve of claim 1, wherein the filters are each formed from a metal sheet.
10. The hydraulic pressure control valve of claim 9, wherein the filters each have a welded joint portion at a position radially opposing the restraining portion.
11. The hydraulic pressure control valve of claim 1, wherein when the axial direction of the peripheral wall is assumed to be a widthwise direction of the filters, the filters each have a substantially uniform width.
12. A hydraulic pressure control valve comprising:
a valve body including a plurality of opening portions formed in a cylindrical peripheral wall at respective positions spaced from each other in an axial direction of the peripheral wall to allow hydraulic fluid to flow therethrough in a radial direction of the peripheral wall, the valve body further having circumferentially continuous annular grooves formed on the peripheral wall at axially spaced positions at which the opening portions are formed, respectively;
a spool valve axially movably provided in the valve body to open and close the opening portions according to a moving position of the spool valve; and
filters wound in the annular grooves to cover the opening portions, respectively;
the filters extending along and covering projections provided in the annular grooves, respectively, the projections projecting radially outward of the peripheral wall, thereby restraining circumferential movement of the filters relative to the valve body.
13. An internal-combustion engine valve timing control apparatus comprising:
a driving rotary member to which rotational force is transmitted from a crankshaft, the driving rotary member having an operation chamber formed therein;
a driven rotary member rotatably accommodated in the driving rotary member to divide the operation chamber into an advance operation chamber and a retard operation chamber, the driven rotary member being rotated relative to the driving rotary member toward an advance side or a retard side in response to supply and discharge of hydraulic fluid into and from the advance and retard operation chambers;
a hydraulic pressure control valve configured to control supply and discharge of hydraulic fluid delivered from an oil pump into and from the advance and retard operation chambers; and
an actuator configured to operate the hydraulic pressure control valve;
the hydraulic pressure control valve comprising:
a valve body including a plurality of opening portions formed in a cylindrical peripheral wall at respective positions spaced from each other in an axial direction of the peripheral wall to allow hydraulic fluid to flow therethrough in a radial direction of the peripheral wall, the valve body further including annular grooves formed on an outer periphery of the peripheral wall at axially spaced positions at which the opening portions are formed, respectively, and a restraining portion provided in each of the annular grooves;

a spool valve axially movably provided in the peripheral wall to open and close the opening portions according to a moving position of the spool valve; and filters wound to cover the opening portions, respectively, the filters each having a mesh portion for filtering the hydraulic fluid and a mask portion covering the restraining portion, wherein when the axial direction of the peripheral wall is assumed to be a widthwise direction of the mask portion, widthwise ends of the mask portion are open;

wherein the restraining portion is a projection projecting radially outward of the valve body; and wherein the mask portion is an outwardly projecting portion projecting radially outward of the valve body to cover the projection.

* * * * *